US008028111B2

(12) United States Patent
Takahashi

(10) Patent No.: US 8,028,111 B2
(45) Date of Patent: Sep. 27, 2011

(54) RADIO COMMUNICATION APPARATUS, COMMUNICATION CONTROL METHOD, AND COMPUTER-READABLE PROGRAM

(75) Inventor: Masato Takahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 250 days.

(21) Appl. No.: 12/258,486

(22) Filed: Oct. 27, 2008

(65) Prior Publication Data

US 2009/0119427 A1 May 7, 2009

(30) Foreign Application Priority Data

Nov. 6, 2007 (JP) ................. 2007-288553

(51) Int. Cl.
*G06F 13/00* (2006.01)
*G06F 13/42* (2006.01)
*H04W 4/00* (2009.01)

(52) U.S. Cl. ...... 710/106; 710/104; 710/105; 455/435.2

(58) Field of Classification Search .......... 710/104–106; 455/435.2
See application file for complete search history.

(56) References Cited

U.S. PATENT DOCUMENTS

| 7,277,710 B1* | 10/2007 | Jones et al. ................ 455/456.1 |
| 2006/0176146 A1 | 8/2006 | Krishan et al. |
| 2008/0320587 A1* | 12/2008 | Vauclair et al. ................. 726/17 |

FOREIGN PATENT DOCUMENTS

| JP | 2006-238413 | 9/2006 |
| JP | 2006-268831 | 10/2006 |
| JP | 2007-251851 | 9/2007 |
| JP | 2008-022525 | 1/2008 |

* cited by examiner

*Primary Examiner* — Mark Rinehart
*Assistant Examiner* — Jeremy S Cerullo
(74) *Attorney, Agent, or Firm* — IPUSA, PLLC

(57) ABSTRACT

A radio communication apparatus configured to perform radio communication according to a first radio communication protocol includes an identification information memory unit configured to store first identification information identifying a host apparatus and second identification information identifying the host apparatus based on a second radio communication protocol, the first and second identification information being associated with each other; an identification information reception unit; an identification information acquisition unit; and a connection request transmission unit.

18 Claims, 12 Drawing Sheets

FIG.10

| HOST ID  | NFCID | SWITCH |
|----------|-------|--------|
| 00:00:01 | AB    |        |
| 00:00:02 | CD    | 1      |
| 00:00:03 |       | 2      |
| 00:00:05 | EF    |        |
| 00:00:06 |       | 3      |
| ...      | ...   | ...    |

RADIO COMMUNICATION APPARATUS, COMMUNICATION CONTROL METHOD, AND COMPUTER-READABLE PROGRAM

BACKGROUND OF THE INVENTION

1. Field of the Invention

This invention relates to a radio communication apparatus, a communication control method, and a computer-readable program.

2. Description of the Related Art

USB memories are known as devices which have been frequently used for apparatuses which include USB (Universal Serial Bus) interfaces (I/F). USB memories have been generally used to share, exchange and transfer data. USB memories are nonvolatile memories which can be portable.

USB memories do not depend on the specification of a host terminal of a personal computer (PC) or the like, and can be immediately identified by the host terminal when connected to the USB I/F of the host terminal. Thus, USB memories are easily used as external memories. This convenience is the reason whey USB memories are frequently used. A user can save a file of a presentation document in a USB memory at an office, and open the file by connecting the USB memory to a PC at a meeting place for presentation. Also, when the USB memory is connected to the host terminal with a wire (cable), electric power is supplied via the USB I/F of the host terminal, and thus a power circuit is not necessary.

Recently, short range radio communication technologies have been developing and radio communication systems have been spreading instead of conventional cable communication systems home and office communication networks. In particular, the wireless USB which applies an UWB (Ultra Wide Band) system can perform high speed transmission and reception of data of large capacity in comparison with radio communication systems such as Bluetooth (a registered trademark), wireless LAN (Local Area Network) or the like. The wireless USB is expected to be a radio communication technology of the next generation. The wireless USB is a communication system which establishes, in advance, a "host" (e.g. a PC and a game machine) and a "device" (the peripheral equipment which is to be connected to the host.) as a master-slave relationship between the communicating devices. The wireless USB communication system is different from the other radio communication systems which assumed many-to-many communication. The network of the wireless USB reduces a circuit scale by restricting the network formation to one-to-many connection. In general, a procedure to determine this master-slave relationship is called an "association". The wire association is performed by connecting a host with a device using a USB wire before performing radio communication, and the numeric association is performed by inputting numbers displayed on a terminal.

FIG. 1 shows a flow diagram describing a conventional association procedure of a wireless USB. In step S1001, a host notifies a device of a CHID (Connection Host ID) which is identification information to identify the host. In step S1002, the device stores the received CHID in a memory (e.g. a nonvolatile memory) of the device. Subsequently, in step S1003, the device notifies the host of a CDID (Connection Device ID) which is identification information to identify the device. In step S1004, the host generates connection information CC (Connection Context) which includes the CHID which is the host's identification information, the CDID received from the device, and an association information CK (connection Key) which associates the host and the device to each other, and the host notifies the device in step S1005. Finally, in step S1006, the connection information CC is stored in the memories of the host and the device, respectively. In this manner, the connection information CC is shared by the host and the device, and thus association is completed.

In such circumstances, USB memories which are conventionally used in cable communication are desired to be developed into a radio communication system. Developing the radio communication system of USB memories is convenient when the USB I/F of a host terminal exists at a place where USB memory cannot connect and when the USB memory cannot be transferred from a specific place based on a security reason. Further, a host terminal can avoid a problem of connecting the USB memory by a cable.

A USB memory key using a function of a wireless transceiver is disclosed in the Japanese Patent Application Publication 2006-268831 (patent documents 1). This USB memory key can establish a radio link with an apparatus by placing the USB memory in a wireless effective range of the apparatus which is a communication partner, such as a computer or the like.

Further, an apparatus is disclosed in Japanese Patent Application Publication 2006-238413 (patent documents 2), in which the apparatus can switch from a cable USB standard communication method to a radio communication method different from the cable USB standard. Also, a procedure of the communication between radio host USB devices is disclosed in the patent document 2.

However, for technologies for developing radio communication systems disclosed in the patent documents 1 and 2 described above, there is a problem in that a process to establish a radio link is complicated. As described above, it is necessary for radio communication of the wireless USB to establish "host" and "device" as a master-slave relationship between apparatuses (devices) by an association in advance of performing radio communication. In such a relationship, a device needs to find a host accepting a new connection to establish a radio link between the host and the device, and needs to send a connection request to the host.

Further, since a USB memory cannot receive power supply from a host terminal, when connected to the host terminal by radio (different from the case of cable connection), the USB memory needs to include a built-in battery. For maintaining the lifetime of the battery, it is important to minimize unnecessary power consumption.

This invention takes into consideration the issues above, and relates to a radio communication apparatus, a communication control method, and a computer-readable recording medium having a communication control program, which provide automatic establishment of a radio link according to the radio communication protocol based on the relationship between a host and a device, and when there is no data communication, power supply from a battery of the device is automatically terminated.

SUMMARY OF THE INVENTION

According to one aspect of the present invention, a radio communication apparatus configured to perform radio communication according to a first radio communication protocol, the radio communication apparatus includes an identification information memory unit configured to store first identification information identifying a host apparatus being connected as a host and second identification information identifying the host apparatus based on a second radio communication protocol, the first and second identification information being associated with each other; an identification information reception unit configured to perform the radio communication with the host apparatus according to the second radio communication protocol and to receive the second identification information of the host apparatus; an identification information acquisition unit configured to refer to the identification information memory unit and to acquire the first identification information associated with the second identification information received by the identification information reception unit; and a connection request transmission unit configured to transmit a connection request to the host apparatus corresponding to the first identification information acquired by the identification information acquisition unit for establishing a radio link according to the first radio communication protocol.

According to another aspect of the invention, a communication control method of a radio communication apparatus performing radio communication according to a first radio communication protocol, the communication control method includes the steps of: (a) receiving second identification information of a host apparatus based on the radio communication with the host apparatus according to a second radio communication protocol; (b) acquiring first identification information associated with the second identification information received in step (a) by referring to an identification information memory unit configured to store the first identification information identifying the host apparatus being connected as a host, the second identification information identifying the host apparatus based on the second radio communication protocol and an association between the first and second identification information; and (c) transmitting a connection request to the host apparatus corresponding to the first identification information acquired in step (b) for establishing a radio link according to the first radio communication protocol.

According to another aspect of the invention, a computer-readable program which, when executed by a computer, causes the computer to perform a radio communication process between radio communication devices according to a first radio communication protocol includes the steps of: (a) receiving second identification information of a host apparatus based on the radio communication with the host apparatus according to a second radio communication protocol; (b) acquiring first identification information associated with the second identification information received in step (a) by referring to an identification information memory unit configured to store the first identification information identifying the host apparatus being connected as a host, the second identification information identifying the host apparatus based on the second radio communication protocol and an association between the first and second identification information; and (c) transmitting a connection request to the host apparatus corresponding to the first identification information acquired in step (b) for establishing a radio link according to the first radio communication protocol.

Other objects, features and advantages of the present invention will become more apparent from the following detailed description when read in conjunction with the accompanying drawings.

BRIEF DESCRIPTION OF THE DRAWINGS

FIG. 10 is an example of a memory table of an identification information memory part;

DETAILED DESCRIPTION OF THE PREFERRED EMBODIMENTS

In the following, embodiments of this invention are described by referring to the accompanied figures.

An embodiment of this invention utilizes wireless USB. A storage device represented by a USB memory is described as an example.

This invention is not limited to the wireless USB and may use other radio communication protocols, as long as the radio communication is performed between predetermined devices (apparatuses) which have a master-slave relationship such as "host" and "device" devices.

Further, this invention is not limited to storage devices, and may be applied to any radio communication apparatuses which perform radio communication based on such a radio communication protocol described above.

[Constitution of Storage Device]

Figure 1:
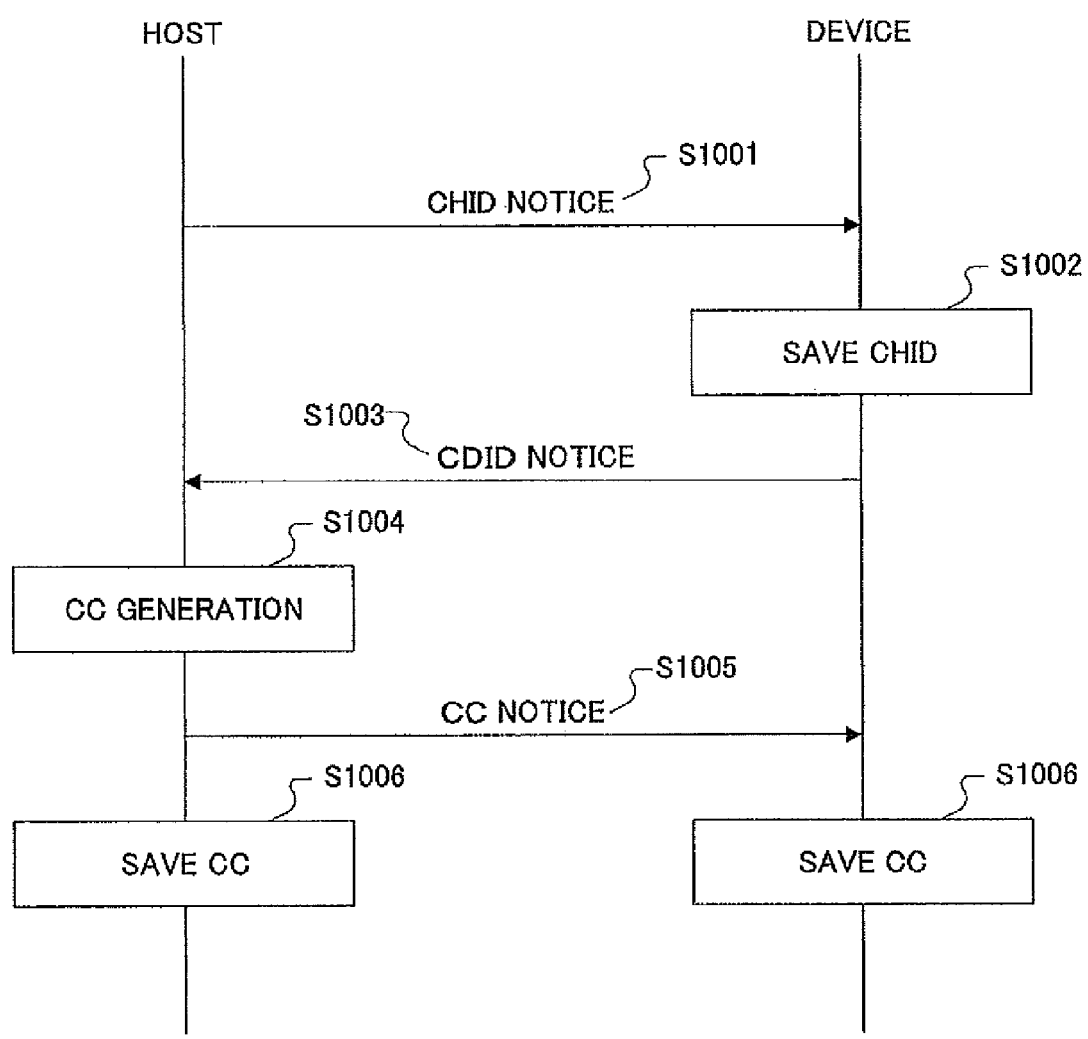
FIG. 1 shows a flowchart describing an association procedure of a conventional wireless USB.
Figure 2:
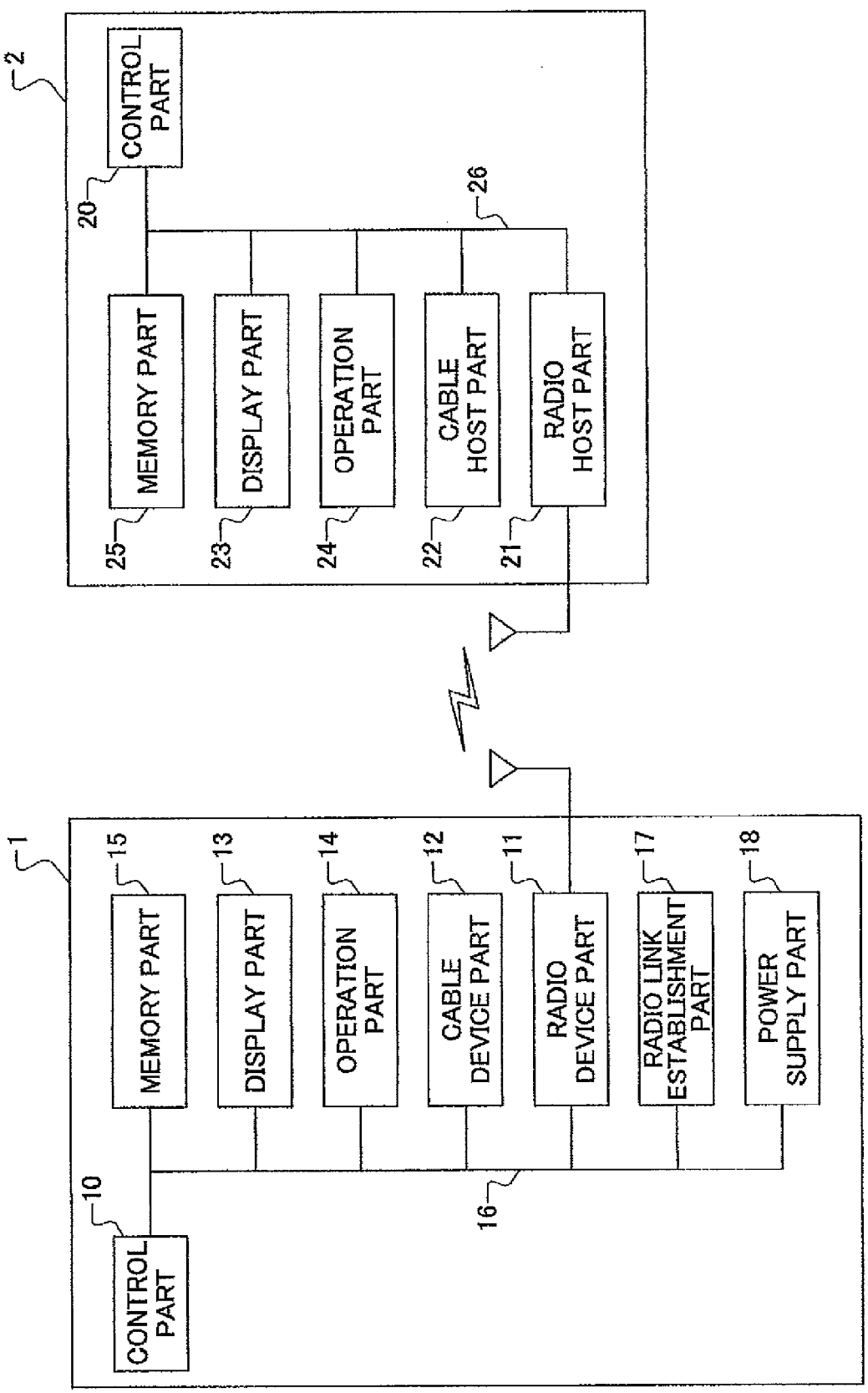
FIG. 2 shows a radio communication network where a storage device of the embodiment is connected to a host terminal.

FIG. 2 shows a radio communication network where a storage device of this embodiment is connected to a host terminal of a PC.

The radio communication network of FIG. 2 includes a storage device 1 as a device terminal and a PC 2 as a host terminal.

The storage device 1 includes a control part 10 connected by a bus 16, a radio USB device part 11 having an antenna part, a cable USB device part 12, a display part 13, an operation part 14, a memory part 15, a radio link establishment part 17, and a power supply part 18.

The control part 10 controls each part of the storage device 1 by executing a program stored in the memory part 15. The radio USB device part 11 performs the radio communication with the host terminal PC 2 via an antenna. The cable USB device part 12 connects between the storage device 1 and the PC 2 with a cable before performing the radio communication and associates the PC 2 as a host terminal. The display part 13 indicates a state of the connection with the PC and/or a communication state and the function setting of the storage device 1 or the like. For example, the display part 13 may be a display, an LED and/or an alarm or the like. The operation part 14 is a user interface which performs on/off of a power supply of the storage device 1 and selects the PC to be connected and/or to establish an access restriction. The memory part 15 includes a memory that stores program data to control each part of the storage device 1 (e.g. RAM, ROM) and another memory that stores the data written and read by the PC 2 (for example, flash memory). The radio link establishment part 17 establishes and cuts off the radio link to the PC 2. The power supply part 18 includes a battery for supplying electricity and controls the power supply from the battery to each part of the storage device 1.

On the other hand, the PC 2 includes a control part 20 connected by a bus 26 and a radio USB host part 21 having an antenna part, a cable USB host part 22, a display part 23, an operation part 24, and a memory part 25.

The control part 20 controls each part of the PC 2 by executing a program stored in the memory part 25. The radio USB host part 21 performs the radio communication with the storage device 1 being a device terminal through the antenna. The cable USB host part 22 connects between the storage device 1 and the PC 2 with a cable before performing the radio communication, and associates the storage device 1 as a device terminal. The display part 23 displays for a user, and the operation part 24 is operated by the user.

Figure 3:
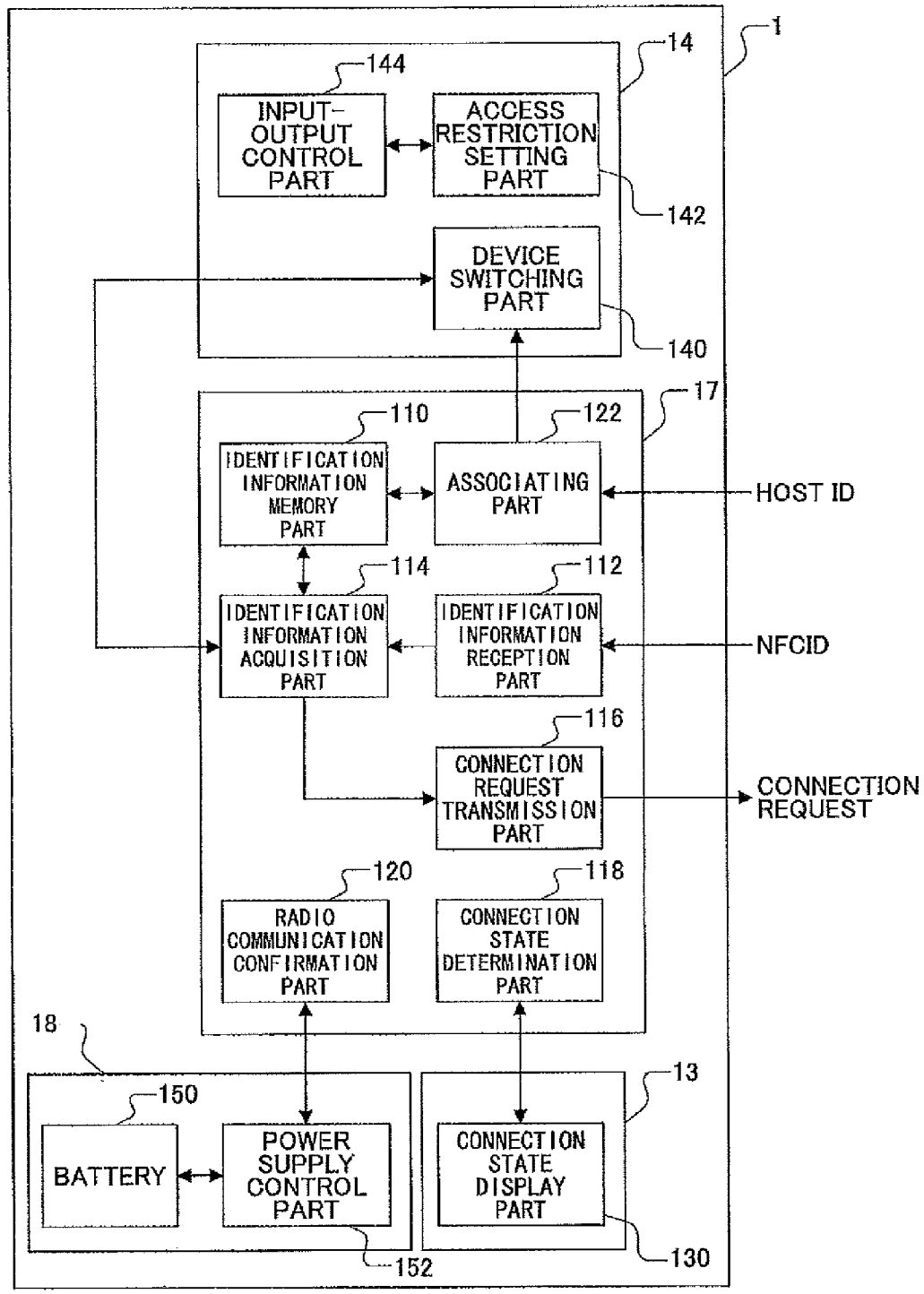
FIG. 3 shows a block diagram describing a constitution of functions of a storage device according to this embodiment.

FIG. 3 is a block diagram describing a function constitution of a storage device of this embodiment. FIG. 3 shows the storage device 1, in which only the display part 13, the operation part 14, the radio link establishment part 17, and power supply part 18 are shown in FIG. 3 because these parts are particularly relevant to the invention (for a clear description).

The radio link establishment part 17 includes: an identification information memory part 110, an identification information reception part 112, an identification information acquisition part 114, a connection request transmission part 116, a connection state determination part 118, a radio communication confirmation part 120, and an identification information association part 122. The identification information memory part 110 associates the first identification information, which identifies a PC to be connected, with the second identification information different from the first identification information to each other, and stores this information. In this embodiment, the first identification information is identification information (hereafter, host ID) issued by a host terminal PC through an association which is performed before performing actual radio communication in the wireless USB radio system. On the other hand, the second identification information is identification information (hereafter NFCID), in which the NFCID is used to identify the PC being a communication partner when proximity radio communication such as NFC (Near Field Communication) is performed for a non-contact type chip card or the like. The identification information reception part 112 receives the NFCID from the PC via the NFC.

In this embodiment, the identification information reception part 112 is a communication module according to NFCIP-1 (Near Field Communication Interface and Protocol). The identification information acquisition part 114 acquires the host ID from the identification information memory part 110. The host ID is associated with the NFCID which is received from the identification information reception part 112 of the PC. The connection request transmission part 116 transmits a connection request to the host PC to establish a radio link with the PC corresponding to the host ID acquired by the identification information acquisition part 114. The connection state determination part 118 determines a connection state with the PC based on a state of the radio USB device part 11 (FIG. 2), in which the PC has transmitted the connection request using the connection request transmission part 116. Namely, the connection state determination part 118 can determine whether the storage device 1 is connected to the PC for the radio communication by the wireless USB. The connection state determination part 118 may have a timer to determine whether the predetermined time has elapsed to establish connection with the PC. The radio communication confirmation part 120 determines whether the radio communication is being performed with the PC to which the connection request transmission part 116 has transmitted a connection request to establish a radio link. The radio communication confirmation part 120 may have a timer to determine whether the radio communication is performed. If a state where the radio communication is not performed continues for a preset time period, the radio communication confirmation part 120 determines that there is no radio communication. The identification information association part 122 communicates with a PC via a cable or radio, and acquires a host ID of the PC. The identification information association part 122 associates the host ID with a setting state of a switch of the operation part 14 (the device switching part 140 will be described later), and stores the host ID, the setting state of the switch and the association between the host ID and the setting state in the identification information memory part 110. The identification information association part 122 may be included in the cable USB device part 12 (FIG. 2). In that case, an arrangement of the host ID for a setting state of a switch is performed when an association is made.

The display part 13 includes a connection state display part 130 which displays a connection state confirmed by the connection state determination part 118, a communication state confirmed by the radio communication confirmation part 120, and/or functions of the storage device 1 established by the operation part 14. The connection state display part 130 includes a display, a LED and/or an alarm or the like. For example, for indicating a connection state, when a connection of the PC is confirmed, a light turns on in case of a LED, and sound is generated in case of an alarm. In the case of a display, "connection OK" may be a displayed.

The operation part 14 includes a device switching part 140, an access restriction setting part 142 and a data input-output control part 144. The device switching part 140 is a mechanical switch having a setting state associated with one or more host ID by the identification information association part 122. By switching the device switching part 140, a user can choose the PC to which the user wants to connect the storage device 1. An access restriction setting part 142 is a mechanical switch to establish an access restriction of the storage device 1 to the PC to be connected. The access restriction includes "read only", "write only", "read and write", and "access unavailable." By switching the access restriction setting part 142, the user can establish such access restriction to the storage device 1. The data input-output control part 144 controls data input-output at the radio link established with the PC based on a setting state of the access restriction setting part 142. The data input-output control part 144 may be included in the control part 10 (FIG. 2). In this case, the data input-output control part 144 controls the radio USB device part 11 and the memory part 15 to control read/write of data.

The power supply part 18 includes an electricity storage part (battery) 150 and a power supply control part 152. The battery 150 stores electrical energy, and the power supply control part 152 controls the power supply from the battery 150 to each part of the storage device 1. The power supply control part 152 can stop supplying power from the battery 150 when the connection state determination part 118 determines no connection with the PC, and/or the radio communication confirmation part 120 detects no radio communication.

Figure 4:
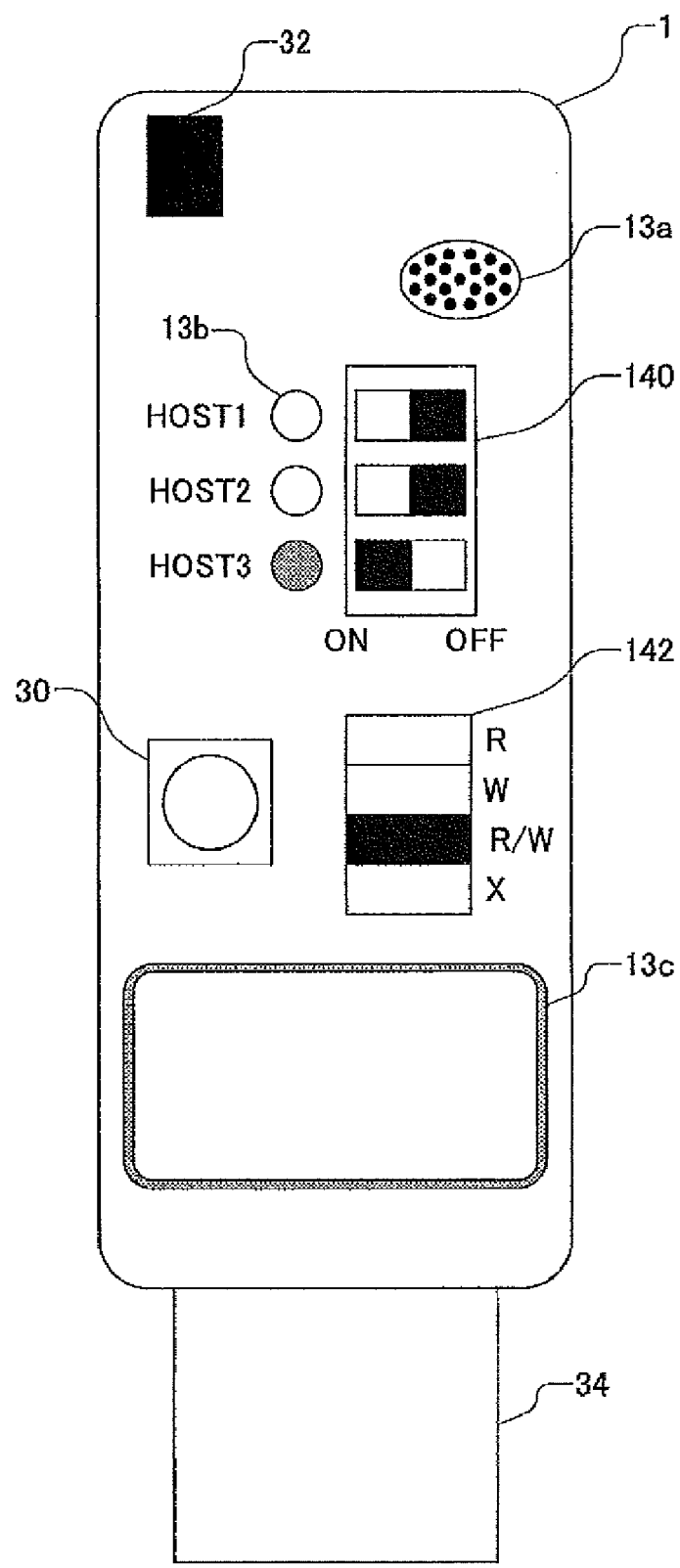
FIG. 4 shows an example of the appearance of a storage device according to this embodiment.

FIG. 4 is an example of the appearance of a storage device according to this embodiment. The storage device 1 of FIG. 4 includes a display part 13 having a speaker 13a, a LED 13b, and a display 13c; a device switching part 140; an access restriction setting part 142; a power supply button 30; a proximity radio communication unit 32; and a USB interface (I/F) part 34.

When the power supply button 30 is pressed, the storage device 1 is turned on and the electricity is supplied from the built-in battery 150 (FIG. 3) to each part of the storage device 1. The proximity radio communication unit 32 is a transmission-reception part to perform radio communication with the PC by NFC, and includes an identification information reception part 112 (FIG. 3). The USB I/F part 34 is inserted into a PC as a host terminal when an association is performed. Further, the USB I/F part 34 includes a built-in antenna part and performs radio communication with the PC by using the wireless USB. In another embodiment, the USB I/F part 34 can perform USB communication using a cable communication by inserting the USB I/F part 34 in a PC when the radio communication by the wireless USB is not available.

The device switching part 140 includes, for example, three switches. Each switch is associated with a different host ID, and a connection request is sent to the PC which corresponds to the host ID by switching on a switch.

The access restriction setting part 142, for example, includes four switches. Each switch corresponds to the access restriction of the storage device 1. The access restriction includes "read only", "write only", "read and write", and "access unavailable", respectively.

A user can establish the access restriction by turning on one of the switches.

The speaker 13a, the LED 13b, and the display 13c are units which indicate a connection state with a PC, settings of the device switching part 140 and the access restriction setting part 142 for the user. For example, for indication of a connection state, when it is confirmed that a PC is connected, a LED turns on when being used, an alarm makes a sound when being used, and a display indicates "connection OK" when being used. In this embodiment, LEDs 13b (chosen by switching on the device switching part 140) are provided for each host terminal. For example, when one of the switches of the device switching part 140 is selected, the storage device 1 is connected to a PC having a host ID associated with the switch, and the one of LEDs 13b corresponding to the PC remains lit while the storage device 1 is connected to a PC.

In the following, the operation of a storage device of this embodiment will be described in detail.

[1. Operation to Establish a Connection with a Host Terminal]

Figure 5:
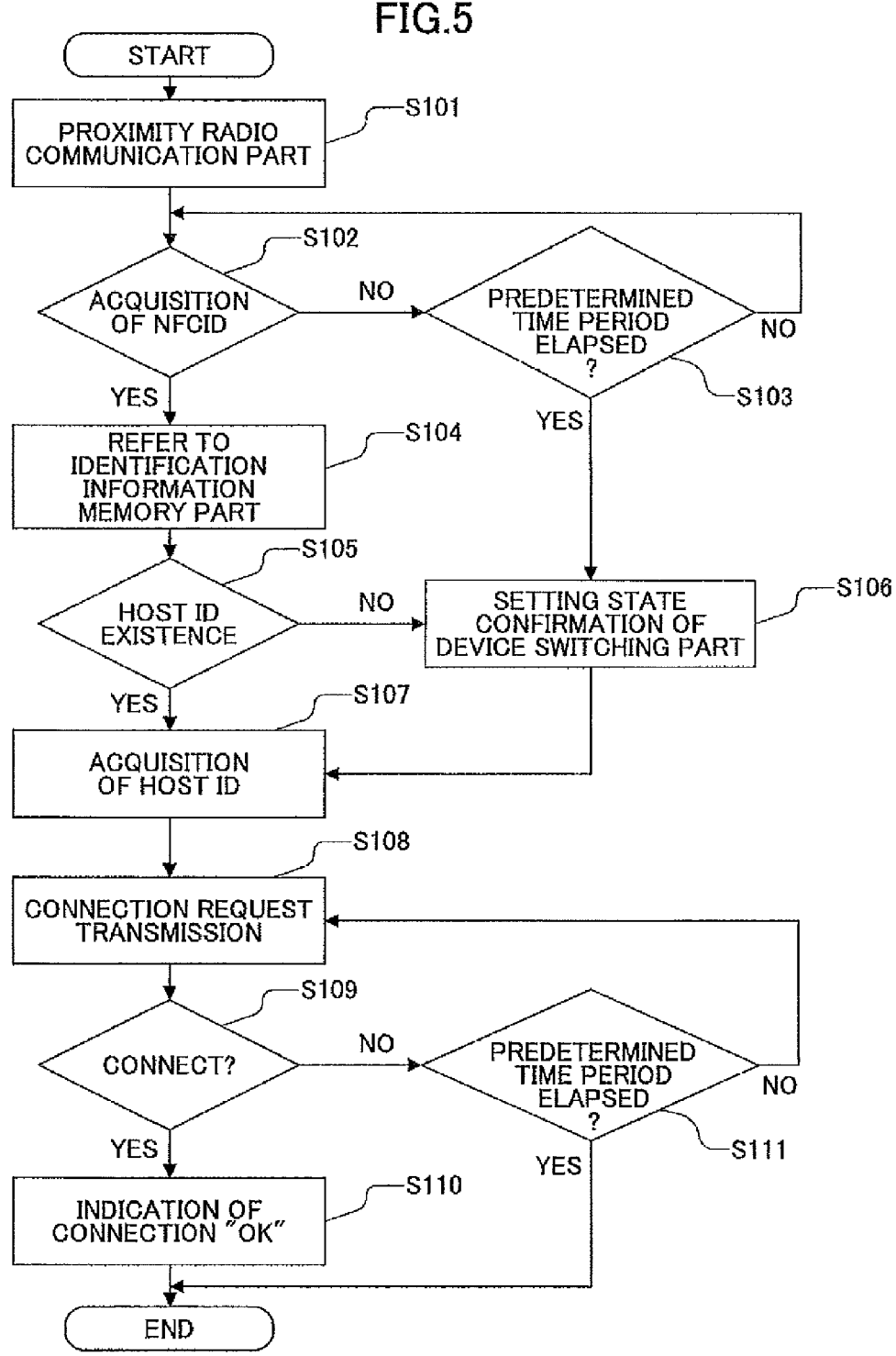
FIG. 5 shows a flowchart describing operations to connect to a host terminal.

FIG. 5 is a flowchart describing the operation to connect to a host terminal. A connecting operation shown in FIG. 5 is initiated by a user pressing the power supply button 3.

At first, in step S101, the proximity radio communication unit 32 starts operating, and the identification information reception part 112 requests an NFCID from a PC located around the storage device 1. The NFCID is information to identify the PC. When an NFCID identifying the PC is transmitted from the PC in response to the request of the storage device 1, the information reception part 112 receives the NFCID at step S102. The identification information reception part 112 may include a timer to determine whether the time spent until receiving the NFCID has reached a predetermined time. When the identification information reception part 112 cannot acquire the NFCID, it is determined whether the predetermined time period has elapsed since the request of the NFCID was transmitted in step S103. The identification information reception part 112 attempts to acquire the NFCID until the predetermined time period elapses. If the predetermined time period elapses without receiving the NFCID, the identification information reception part 112 notifies the identification information acquisition part 114 of the fact that the NFCID could not be received. The identification information acquisition part 114 confirms a setting state of the device switching part 140 in step S106, and acquires a host ID associated with the setting state from the identification information memory part 110, in step S107.

On the other hand, when the identification information reception part 112 receives the NFCID, the identification information reception part 112 notifies the identification information acquisition part 114 of the NFCID. The identification information acquisition part 114 refers to the identification information memory part 110, in step S104, in order to find the host ID associated with the NFCID received by the identification information reception part 112. After finding the desired host ID in step S105, the identification information acquisition part 114 begins to read the host ID in step S107. When the desired host ID is not found in step S105, the identification information acquisition part 114 confirms a setting state of the device switching part 140 in step S106, and acquires the host ID associated with the setting state from the identification information memory part 110 in step S107.

In step S108, the connection request transmission part 116 transmits a connection request to the PC corresponding to the host ID acquired by the identification information acquisition part 114 to establish a radio link. In step S109, the connection state determination part 118 determines whether a connection state with the PC which has transmitted the connection request using the connection request transmission part 116 based on a state of the radio USB device part 11 (FIG. 2). When the storage device 1 is connected to the PC for radio communication by using the wireless USB, the status is displayed on the connection state display part 130 in step S110.

Further, the connection state determination part 118 may include a timer which judges whether the time spent to establish the connection with the PC has reached a predetermined time. In this case, if the connection to the PC is not confirmed, it is judged that the predetermined time has passed since the connection request was transmitted in step S111. The connection request transmission part 116 attempts to perform a connection to the PC until the predetermined time period passes. If the connection to the PC cannot be established and the predetermined time has passed, the storage device 1 terminates the series of the connecting operation. In this case, the storage device 1 may notify the user of the fact that the connection to the PC has not been established by displaying on the connection state display part 130.

In this manner, by using proximity radio communication such as an NFC and a switch assigned to the host ID, a storage device of this embodiment can substantially establish a radio link with a host terminal automatically without a user operation.

Figure 6:
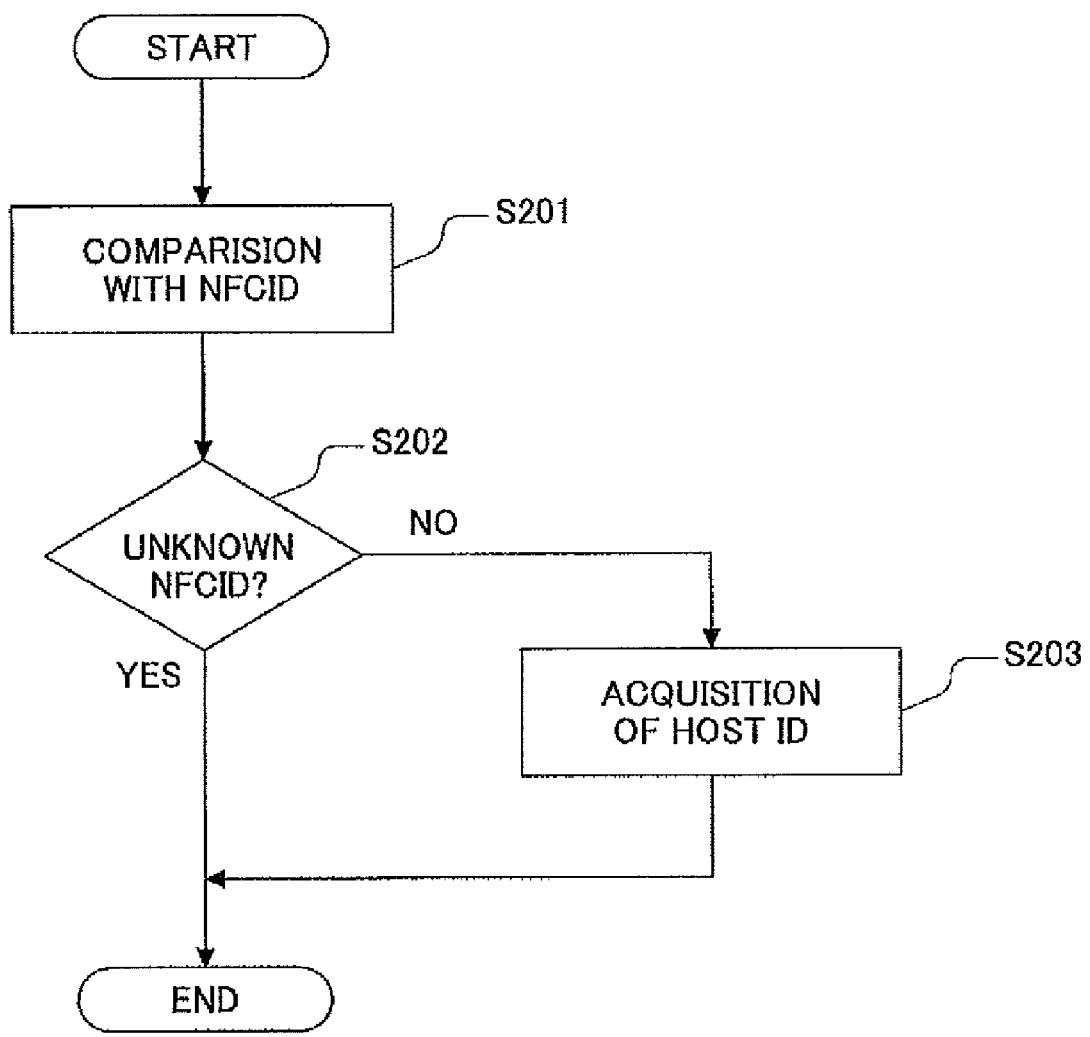
FIG. 6 shows a flowchart describing operations acquiring a host ID from an identification information memory part based on NFCID.

Next, the operation which acquires a host ID from the identification information memory part 110 based on the NFCID is described in detail referring to a flowchart of FIG. 6.

First, when the identification information reception part 112 receives (step S201 of FIG. 5) an NFCID sent by a PC located near a storage device, the identification information acquisition part 114 collates the NFCID sent by the PC with an NFCID stored in the identification information memory part 110 (also in step 201). The NFCID was received by the identification information reception part 112. In step S202, the identification information acquisition part 114 determines whether the NFCID received by the identification information reception part 112 matches an NFCID stored in the identification information memory part 110. When an NFCID matching with the NFCID received by the identification information reception part 112 is stored, in step S203, the identification information acquisition part 114 acquires a host ID associated with the NFCID from the identification information memory part 110.

[Operation to Memorize Host ID]

Next, an operation is described for performing and storing associations between the host ID and each setting state of the NFCID and switches.

Figure 7:
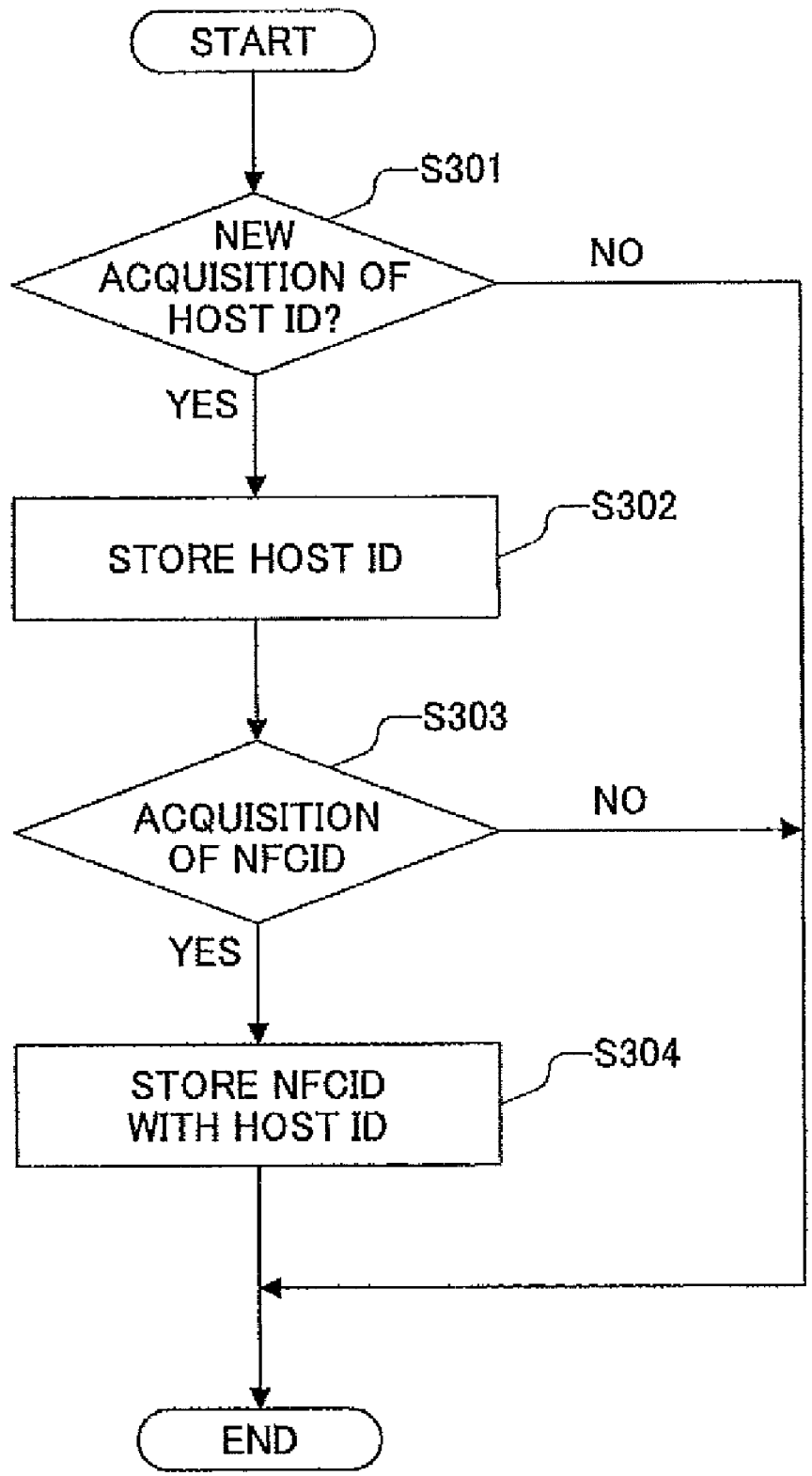
FIG. 7 shows a flowchart describing operations to store a host ID associating with an NFCID.

FIG. 7 is a flowchart describing an operation to perform associations between the host ID and each setting state of the NFCID and switches and store. The operation of a FIG. 7 is performed to associate with a host terminal first.

For example, when an association is performed to associate with the PC connected via the cable USB device part 12 (FIG. 2) as "a host" in the storage device 1, the connection information CC including a host ID is shared with the storage device 1 and a PC. In step S301, the cable USB device part 12 determines whether the host ID included in the connection information CC is new information which has not been associated with any NFCID and stored in the identification information memory department 110. When the host ID is new information, the cable USB device part 12 stores this host ID in the identification information memory department 110 in step S302. On the other hand, when the host ID is not new information the, the cable USB device part 12 terminates the association.

Subsequently in step S303, the storage device 1 requests the NFCID from the PC associated as a host terminal via the proximity radio communication unit 32. When the NFCID specifying itself is transmitted by the PC the storage device 1 in response to the request, in step S304, the NFCID is received by the identification information reception part 112 and associated with the host ID stored previously with the association in the identification information memory part 110. On the other hand, when the NFCID is not received in the identification information reception part 112, the cable USB device part 12 terminates the association. In this case, it may be notified to the user that the NFCID was not received and associated with the host ID by the display part 13.

In this manners the host ID can be stored with the association with the NFCID. Thereby, using proximity radio communication such as an NFC, a radio link can be automatically established with a host terminal.

Figure 8:
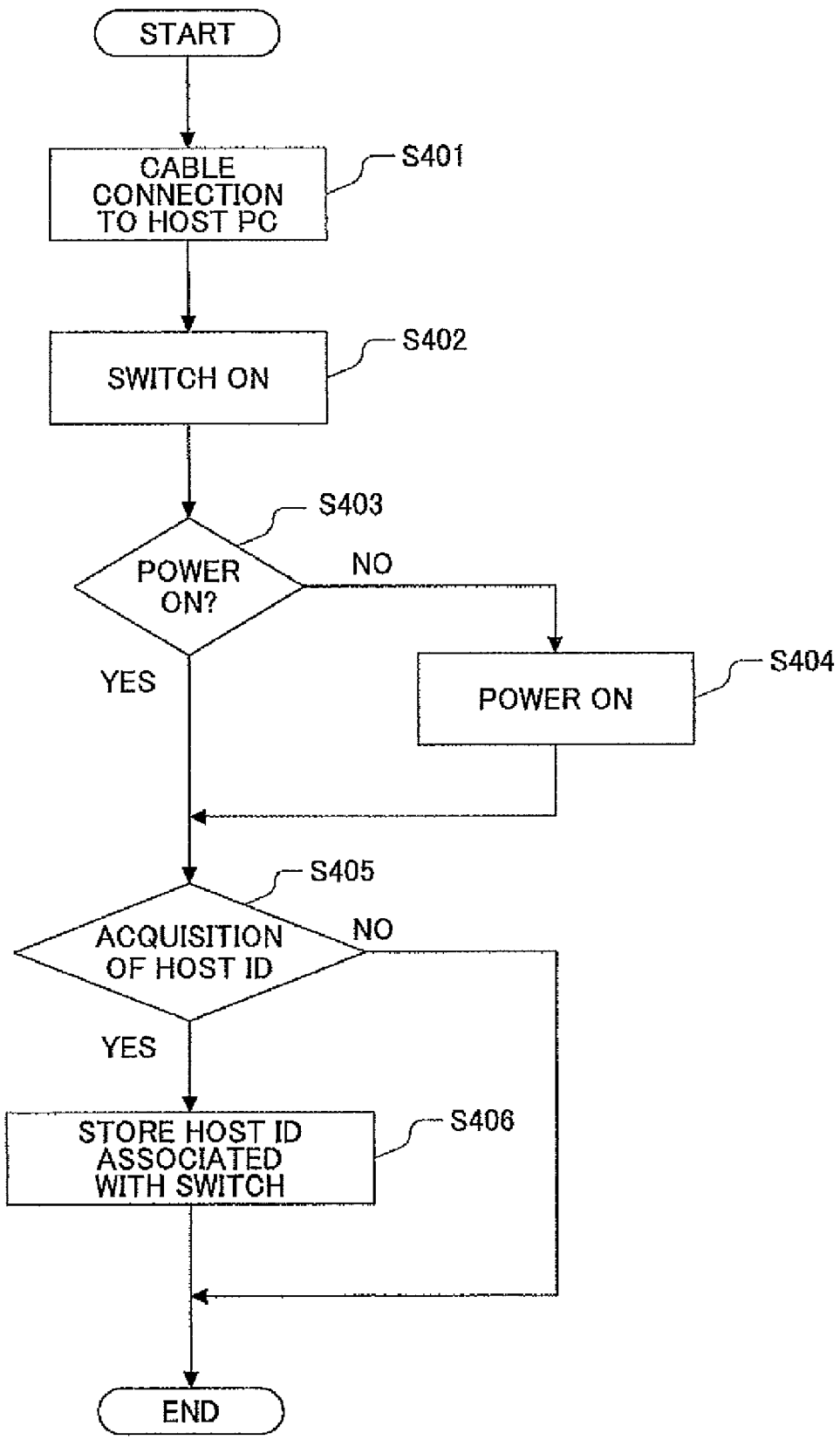
FIG. 8 shows a flowchart describing operations to store a host ID associating with a setting state of a device switching part.

FIG. 8 is a flowchart explaining the operation to associate the host ID with a setting state of an apparatus switching part and to store the association in a storage device of this embodiment.

In step S401, the storage device 1 is first connected to the PC through the cable USB device part 12. After connecting, in step S402, a user switches on a switch of the device switching part 140 in which the switch is selected to associate with the PC.

Subsequently, in step S403, the power supply control part 152 determines whether the power supply switch of the storage device 1 is turned on. That is, the power supply control part 152 determines whether the power is supplied to each part of the storage device 1 based on a state where the power supply button 30 (FIG. 4) is pressed down or the power is supplied from the PC over the cable USB device part 12. When the power supply is not turned on, in step S404, the power supply control part 152 turns on the power supply automatically.

After the power supply is turned on, the cable USB device part 12 acquires a host ID from the PC connected at step S405 by the identification information association part 122.

The cable USB device part 12 stores the host ID acquired at step S406 in the identification information memory region 110, associating with the switch being turned on. On the other hand, when the host ID cannot be acquired from the PC, the power supply control part 152 turns off the power or user is notified that the host ID cannot be acquired from the PC via the display part 13.

Operation shown in FIG. 8 may be performed when associating with a host terminal, which is similar to the associating operation with the NFCID described in FIG. 7. In this case, it can be determined whether the association of the host ID should be performed with the NFCID or a switch based on which switch of the device switching part 140 is turned on.

Further, in this embodiment, the host ID associated with the switch has been acquired from the PC via the cable USB device part 12. Alternately, as another embodiment, by placing the storage device 1 close to the PC, the host ID may be acquired by the NFC via the proximity radio communication part 32 (FIG. 4).

In this manner, the host ID can be stored with associating a setting state of the device switching part which is a mechanical switch. This makes it possible to establish a radio link with the host terminal by switching a setting of the device switching part without the trouble of complicated procedures.

Figure 9:
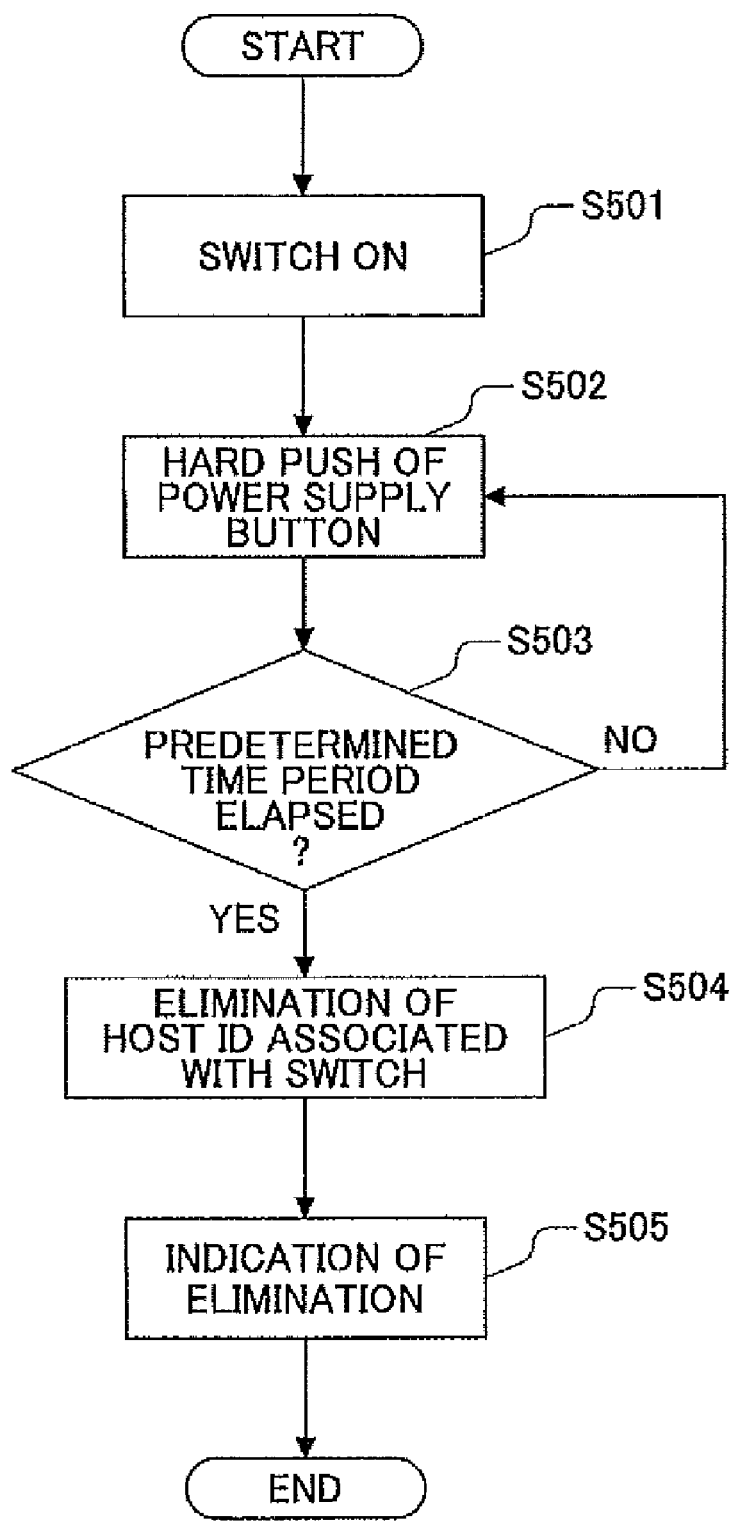
FIG. 9 is a flowchart describing operations to eliminate the host ID stored with an association of a setting state of a device switching part.

FIG. 9 is a flowchart describing an operation which eliminates the host ID stored with the association of a setting state of the device switching part.

First, in step S501, a switch of the device switching part 140 is turned on and the switch is selected to eliminate the association with the host ID.

Next in step S502, the power supply button 30 is firmly pressed by a user, and the identification information association part 122 measures whether a predetermined time has elapsed since the power supply button was pressed in step S503. When the predetermined time elapses since the power supply button has been pressed, in step S504, the identification information association part 122 eliminates a host ID from the identification information memory part 110. Here the stored host ID is associated with the switch.

In step S505, after the host ID is eliminated by the identification information memory part 110, the display part 13 notifies a user of the elimination.

FIG. 10 shows an example of a memory table of the identification information memory part 110. The identification information memory part 110 includes a memory table 40 of FIG. 10 indicated as an example. The memory table 40 includes the first line 42 to store a host ID, the second line 44 to store an NFCID, and the third line 45 to store a setting state of the device switching part 140 (the switch is assigned a host ID). In this embodiment, the setting state of the device switching part 140 corresponds to a state where a particular switch is selected, in which the switches can be switched by a turn-on or turn-off operation. The information to be associated is stored on the same line of the table.

One host ID may be associated with an NFCID and a switch, respectively.

[Operation to Turn Off the Power Supply Automatically]

Figure 11:
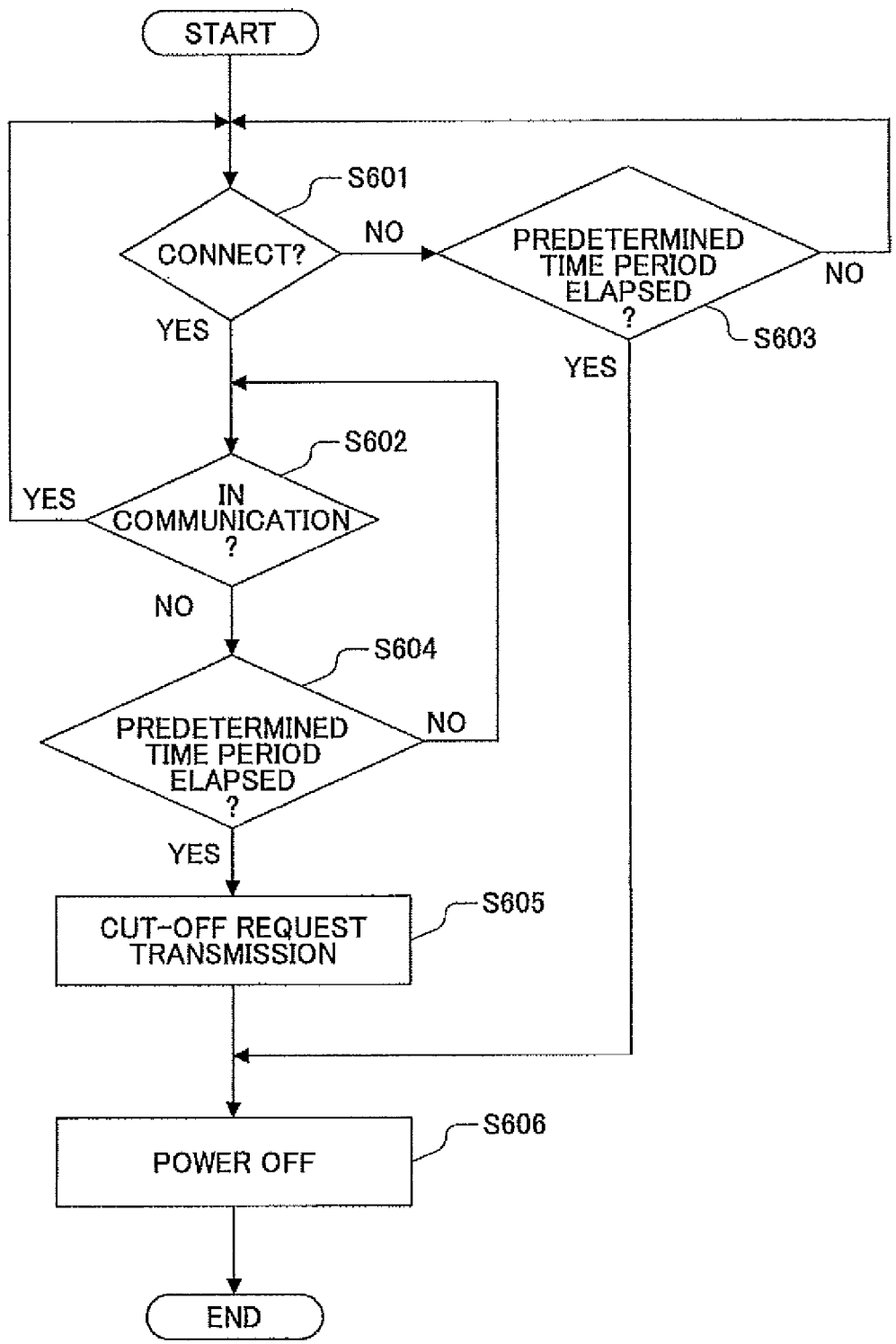
FIG. 11 shows a flowchart describing operations to turn off a power supply automatically.

In the above, for the storage device of this embodiment, it is described that a radio link with a host terminal can be automatically established without an operation by a user. Further, the storage device of this embodiment can automatically terminate a radio link established with a host terminal and turn off the power supply of the storage device automatically. With reference to FIG. 11, it is described how the operations terminate the radio link automatically and turn off the power supply.

It is assumed that the storage device 1 has transmitted a connection request(as described above with regard to the operation by reference to FIG. 5) to establish a radio link with the PC corresponding to a host ID acquired by the identification information acquisition part 114 via the connection request transmission part 116 (step S108 of FIG. 5).

In this case, in step S601, the connection state determination part 118 determines a connection state with the PC having received a connection request transmitted by the connection request transmission part 116 based on a state of the radio USB device part 11 (FIG. 2). When the storage device 1 is connected to a PC so that radio communication is performed by the wireless USB, in the next step S602, the radio communication confirmation part 120 determines whether radio communication is performed via a radio link established with the PC to which the connection request transmission part 116 transmitted the connection request. When the radio communication is being performed, the process returns to step S601 and the series of processes is repeated to confirm a connection state and a communication state (step S601 and S602).

Also, the connection state determination part 118 may have a timer to measure whether time until a connection is established with a PC elapses over a predetermined time. In this case, if a connection with the PC is not confirmed in step S01, it is determined whether a predetermined time elapses since the connection request has been transmitted in step S603. The connection request transmission part 116 attempts connection with the PC until a predetermined time passes. If a predetermined time elapses without establishing a connection with the PC, in step 8606, the connection state determination part 118 notifies the power supply control part 152 that the connection with the PC is not established. In response to this notice, the power supply control part 152 stops power from being supplied from the battery 150 to each part of the storage device 1 and turns off the power supply.

On the other hand, the radio communication confirmation part 120 may have a timer which measures the time that elapses in which the radio communication is not performed for a predetermined time and determines whether such a situation exists.

In this case, if the radio communication with the PC is not confirmed in step S602, since it has been confirmed that the radio communication is not performed in step S604, it is determined whether the predetermined time elapsed. If the predetermined time elapses after the confirmation of no radio communication, in step S605, the radio communication confirmation part 120 notifies the connection request transmission part 116 that radio communication is not being performed. In response to this notice, the connection request transmission part 116 transmits a termination request to the PC which is in connection with the storage device 1. After terminating the connection with the PC, in step S606, the connection state determination part 118 notifies the power supply control part 152 that the connection with the PC has been terminated. Responding to this notice, the power supply control part 152 stops power supply from the battery 150 to each part of the storage device 1 and terminates the power supply.

In this manner, by confirming a connection state and/or a communication state with a host terminal (e.g. PCs in this embodiment), when a storage device is in a state of no data communication, the storage device cuts off the connection with the host terminal automatically, and turns off the power supply of the storage device. Accordingly, efficient power consumption can be achieved, so that the lifetime of a battery can be extended.

[Operation to Establish Access Restriction]

Figure 12:
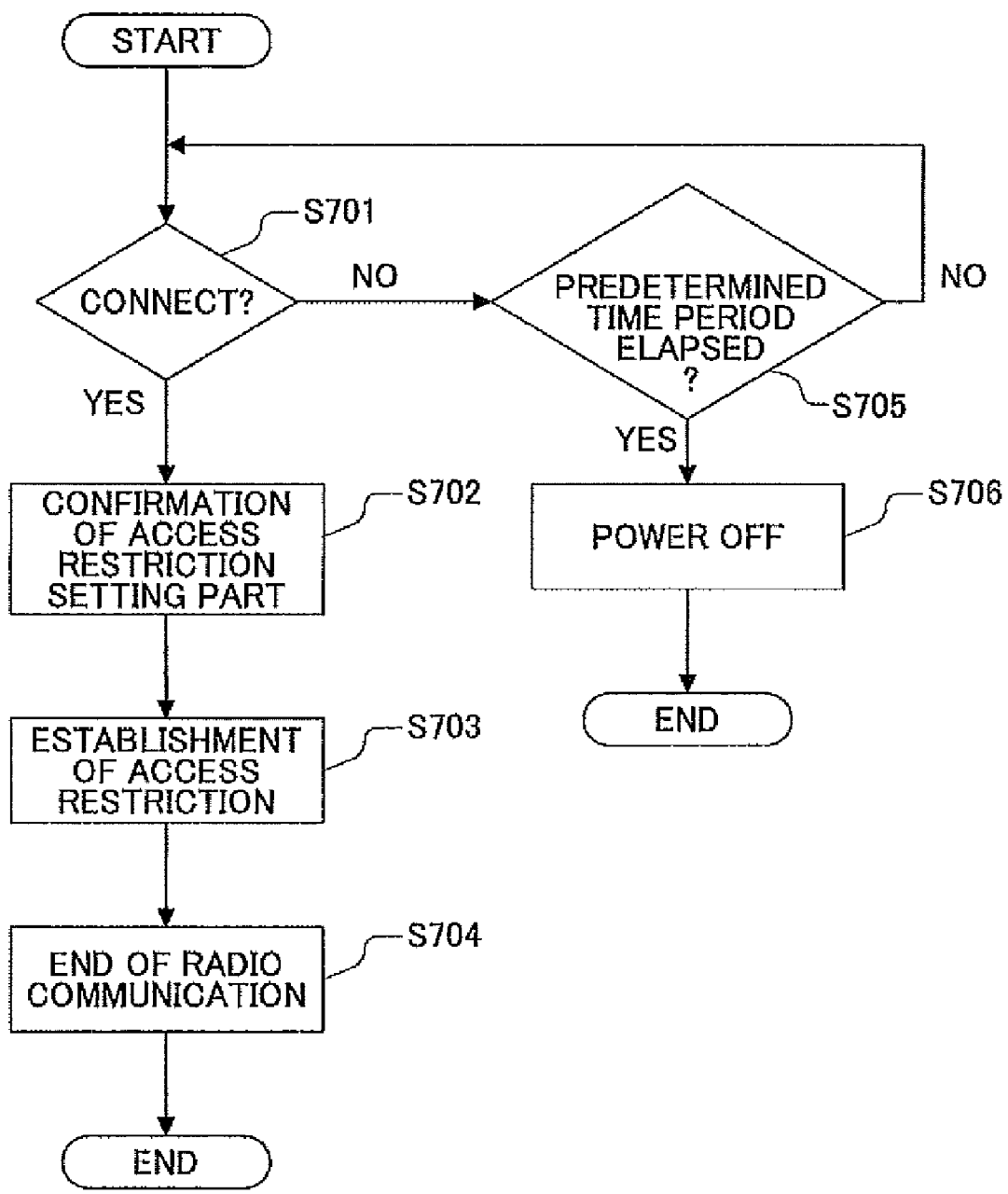
FIG. 12 shows a flowchart describing operations to establish an access restriction (limit) from a PC to a storage device.

Further, a storage device of this embodiment can establish an access restriction from a connected PC. With reference to FIG. 12, an operation to set an access restriction from a connected PC to a storage device is described.

As previously described to explain the operation with reference to FIG. 5, it is assumed that the storage device 1 has transmitted a connection request to a PC to establish a radio link. Here, the PC corresponds to a host ID which is acquired by the connection request transmission part 114 via the connection request transmission part 116 (step S108 of FIG. 5).

In this case, in step S701, the connection state determination part 118 determines a connection state with the PC based on a state of the radio USB device part 11 (FIG. 2), in which the connection request has been transmitted to the PC by the connection request transmission part 116.

When the storage device 1 is connected to the PC so that radio communication can be performed by the wireless USB, the data input-output control part 144 confirms a setting state of the access restriction setting part 142 in step S702. Here, the access restriction setting part 142 is selected to either "read only", "write only", "write and read" or "access unavailable" by switching the mechanical switches shown in FIG. 4. In step S703, the data input-output control part 144 establishes an access restriction to control data input and output in a radio link established with the PC based on the setting state of the access restriction setting part 142.

Under the set access restriction, the storage device 1 performs radio communication with the PC via the radio USB device part 11 in step S704. Next, an operation of confirming the communication state is explained with reference to FIG. 11 (step 602 of FIG. 11).

On the other hand, when the connection with the PC is not confirmed in step S701, it is determined whether a predetermined time has elapsed since a connection request has been transmitted in step S705. The connection request transmission part 116 attempts to perform connection with the PC until a predetermined time period elapses. If a predetermined time period elapses without making a connection with the PC, in step S706, the connection state determination part 118 notifies the power supply control part 152 that the connection with the PC is not established. In response to this notice, the power supply control part 152 stops supplying power from the battery 150 to each part of the storage device 1 and turns off the power supply.

In general, a radio communication system is different from the cable communication system in which the data communication is limited within a cable, and an access of the radio communication is possible within a range where the signal (electric waves) can propagate. Therefore, a security level can be improved by establishing an access restriction.

MODIFIED EXAMPLE

The present embodiment of this invention has been described as an example of a radio communication apparatus regarding a storage device of the USB memory. Further, as long as the radio communication is performed between apparatuses in accordance with a radio communication protocol that defines the master and slave relationship such as a host and a device, this invention can apply to any such apparatus. Also, the radio communication protocol is not limited to the wireless USB, as long as a radio communication protocol defines the master and slave relationship such as a host and a device, this invention can be applied to any radio communication protocol.

Further, a function of this invention may be achieved by a computer-readable program stored in a random-access memory (RAM), a read only memory (ROM), a storage device such as a flash memory or other hardware.

Although, the preferable embodiments of this invention has been explained above, the present invention is not limited to the specifically disclosed embodiments, and variations and modifications may be made without departing from the scope of the present invention.

The present application is based on Japanese priority application No. 2007-288553 filed on Nov. 6, 2007, the entire contents of which are hereby incorporated herein by reference.

What is claimed is:

1. A radio communication apparatus configured to perform radio communication according to a first radio communication protocol, the radio communication apparatus comprising:
   an identification information memory unit configured to store first identification information identifying each of a plurality of host apparatuses being connected to the radio communication apparatus as a host and second identification information identifying the each of the host apparatuses based on a second radio communication protocol, the first and second identification information being associated with each other, and obtained by an association process between the radio communication apparatus and the host apparatus before the radio communication according to the first radio communication protocol;
   an identification information reception unit configured to perform the radio communication with the plurality of host apparatuses according to the second radio communication protocol and to receive the second identification information of the plurality of host apparatuses;
   a device switching unit configured to switch a setting state associated with first identification information of one of the plurality of host apparatuses to be connected among the plurality of host apparatuses;
   an identification information acquisition unit configured to refer to the identification information memory unit and to acquire the first identification information associated with a second identification information of the one of the host apparatuses received by the identification information reception unit, the identification information acquisition unit being configured to acquire first identification information of another one of the plurality of host apparatuses associated with a present setting state of the device switching unit when the identification information acquisition unit cannot acquire the first identification information associated with the second identification information of the one of the host apparatuses from the identification information memory unit; and
   a connection request transmission unit configured to transmit a connection request to the host apparatus corresponding to the first identification information acquired by the identification information acquisition unit, the connection request used for establishing a radio link according to the first radio communication protocol,
   wherein the radio communication apparatus is a storage device as a device terminal.

2. The radio communication apparatus as claimed in claim 1, further comprising an identification information association unit,
   wherein the identification information association unit communicates with the host apparatus via a wire or based on the second radio communication protocol,
   the identification information association unit acquires the first identification information of the host apparatus and associates the first identification information with the setting state of the device switching unit, and
   the identification information memory unit stores the setting state of the device switching unit and the first identification information associated with the setting state.

3. The radio communication apparatus as claimed in claim 1, further comprising:
   a connection state determination unit configured to determine a connection state of the host apparatus having received the connection request transmitted by the connection request transmit unit, and
   a power supply control unit configured to turn off a power supply of the radio communication apparatus when the connection state determination unit determines that a radio link is not established with the host apparatus.

4. The radio communication apparatus as claimed in claim 3, further comprising:
   a radio communication confirmation unit configured to detect whether radio communication is being performed in the radio link established with the host apparatus having received the connection request transmitted by the connection request transmit unit,
   wherein the power supply control unit turns off the power supply of the radio communication apparatus when the radio communication confirmation unit determines that the radio communication is not being performed.

5. The radio communication apparatus as claimed in claim 1, further comprising:
   a connection state determination unit configured to determine a connection state of the host apparatus having received the connection request transmitted by the connection request transmit unit; and
   a connection state display unit configured to display a detection result determined by the connection state determination unit.

6. The radio communication apparatus as claimed in claim 1, further comprising:
   an access restriction setting unit configured to restrict an access from the host apparatus to the radio communication apparatus; and
   a data input-output control unit configured to control data input-output via the radio link established with the host apparatus based on a setting state of the access restriction setting unit.

7. The radio communication apparatus as claimed in claim 1, wherein the first radio communication protocol is a wireless USB.

8. The radio communication apparatus as claimed in claim 1, wherein the second communication protocol is NFCIP.

9. The radio communication apparatus as claimed in claim 1, wherein the device switching unit has a plurality of switches, each of the switches being associated with each different first identification information of the each of the plurality of host apparatuses.

10. A communication control method of a radio communication apparatus performing radio communication according to a first radio communication protocol, the communication control method comprising the steps of:
   (a) receiving second identification information of one of a plurality of host apparatuses based on the radio communication with the host apparatus according to a second radio communication protocol;

(b) acquiring first identification information associated with the second identification information of the one of the plurality of host apparatuses received in step (a) by referring to an identification information memory unit configured to store the first identification information identifying each of the plurality of host apparatuses being connected to the radio communication apparatus as a host, and the second identification information identifying each of the plurality of host apparatuses based on the second radio communication protocol, the first and second identification information being associated with each other, and obtained by an association process between the radio communication apparatus and the host apparatus before the radio communication according to the first radio communication protocol; and (c) transmitting a connection request to the host apparatus corresponding to the first identification information acquired in step (b) for establishing a radio link according to the first radio communication protocol, wherein the method further comprising:

(d) acquiring first identification information of another one of the plurality of host apparatuses associated with a setting of a device switching unit provided to the radio communication apparatus for setting state associated with first identification information of particular one of the plurality of host apparatuses when the step (b) cannot acquire the first identification information associated with the second identification information of the one of the plurality of host apparatuses from the identification information memory unit; and wherein the radio communication apparatus is a storage device as a device terminal.

11. The communication control method as claimed in claim 10, further comprising an identification information association step, wherein the identification information association step includes communicating with the host apparatus via a wire or based on the second radio communication protocol, and acquiring the first identification information of the host apparatus and associating the first identification information with the setting state of the device switching unit.

12. The communication control method as claimed in claim 10, further comprising:

a connection state determination step of determining a connection state with the host apparatus having received the connection request transmitted in step (c); and a power supply control step of turning off a power supply of the radio communication apparatus when the connection state determination step determines that a radio link is not established with the host apparatus.

13. The communication control method as claimed in claim 12, further comprising a radio communication confirmation step of detecting whether radio communication is being performed in the radio link established with the host apparatus having received the connection request transmitted in step (c), wherein the power supply control step turns off the power supply of the radio communication apparatus when the radio communication confirmation step determines that the radio communication is not being performed.

14. The communication control method as claimed in claim 10, further comprising a connection state determination step of determining a connection state with the host apparatus having received the connection request transmitted in step (c) and a connection state display step of displaying a detection result determined by the connection state determination step.

15. The communication control method as claimed in claim 10, further comprising an access restriction setting step of restricting an access from the host apparatus to the radio communication apparatus and a data input-output control step of controlling data input-output at the radio link established with the host apparatus based on the setting state of the access restriction setting step.

16. The communication control method as claimed in claim 10, wherein the first radio communication protocol is a wireless USB.

17. The communication control method as claimed in claim 10, wherein the second communication protocol is NFCIP.

18. A non-transitory computer readable medium having instructions executable by a computer to execute a computer-readable program which, when executed by the computer, causes the computer to perform a radio communication process between a host apparatus and radio communication devices according to a first radio communication protocol, said radio communication process comprising the steps of:

(a) receiving second identification information of one of a plurality of host apparatuses by the radio communication devices based on the radio communication with the host apparatus according to a second radio communication protocol;

(b) acquiring first identification information associated with the second identification information of the one of the plurality of host apparatuses received in step (a) by referring to an identification information memory unit configured to store the first identification information identifying each of the plurality of host apparatuses being connected with the radio communication devices as a host, and the second identification information identifying the each of the plurality of host apparatuses based on the second radio communication protocol, the first and second identification information being associated with each other, and obtained by an association process between the radio communication devices and the host apparatus before the radio communication according to the first radio communication protocol; and (c) transmitting a connection request to the host apparatus corresponding to the first identification information acquired in step (b) for establishing a radio link according to the first radio communication protocol, wherein the method further comprising:

(d) acquiring first identification information of another one of the plurality of host apparatuses associated with a setting state of a device switching unit provided to the radio communication apparatus for switching the setting state associated with first identification information of particular one of the plurality of host apparatuses, when the step (b) cannot acquire the first identification information associated with the second identification information of the one of the plurality of host apparatuses from the identification information memory unit; and wherein the radio communication devices are storage devices as device terminals.

* * * * *